United States Patent [19]

Manor

[11] 3,980,152

[45] Sept. 14, 1976

[54] AIR POWERED VEHICLE

[76] Inventor: Robert T. Manor, P.O. Box 95, Salmonia, Ind. 47381

[22] Filed: Apr. 5, 1974

[21] Appl. No.: 458,178

Related U.S. Application Data

[62] Division of Ser. No. 341,318, March 14, 1973.

[52] U.S. Cl. ............................ 180/66 B; 267/65 D; 417/211; 417/231

[51] Int. Cl.$^2$ ........................................... F16F 11/30

[58] Field of Search ............. 267/64 R, 65 R, 65 D; 280/106, 5; 417/211, 231; 180/66 B, 66 R; 60/484 C; 91/413; 137/596

[56] References Cited

UNITED STATES PATENTS

| | | | |
|---|---|---|---|
| 1,337,501 | 4/1920 | Arluskes | 180/66 B |
| 1,963,091 | 6/1934 | Jenkins | 180/66 B |
| 2,540,708 | 2/1951 | Bowden et al. | 267/64 R |
| 2,853,102 | 9/1958 | Walker | 91/413 |
| 3,210,063 | 10/1965 | Kirsch | 267/64 R |
| 3,774,634 | 11/1973 | Bonney | 137/596 |

*Primary Examiner*—James B. Marbert

[57] ABSTRACT

This invention relates to an air powered vehicle including a chassis and wheels to which is connected an airpowered, reciprocating piston engine having intake and exhaust systems. A suspension type compressor is operatively connected between a wheel and the chassis whereby vertical movement of the wheel due to unevenness of the road or bumps provided on the wheel causes the compressor to operate and provide compressed air. This compressor is provided with inlet and exhaust ports connected, respectively, to a reservoir, whereby operation of the compressor pumps air to the reservoir for operation of the engine.

8 Claims, 19 Drawing Figures

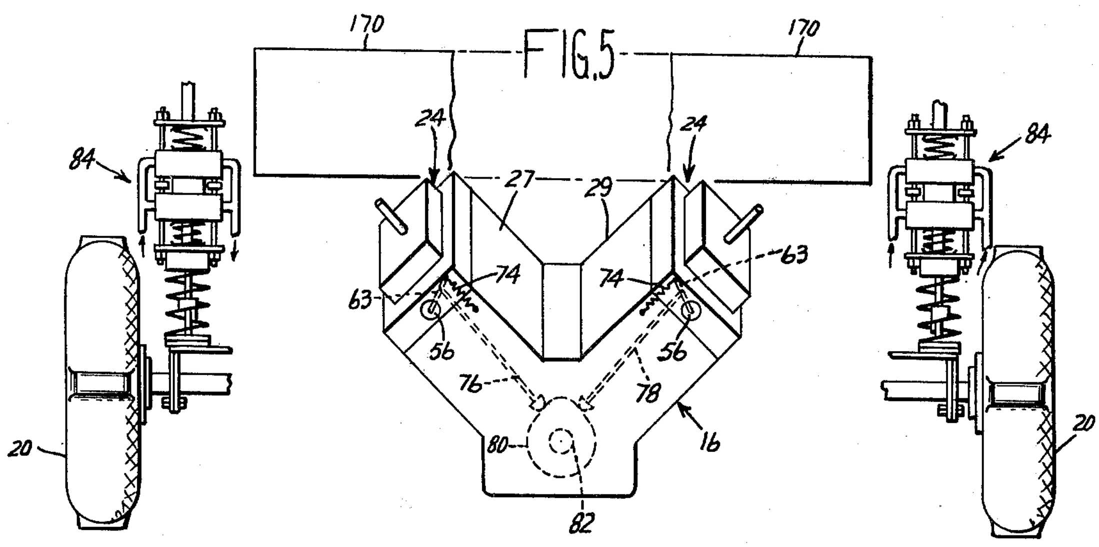
FIG.5
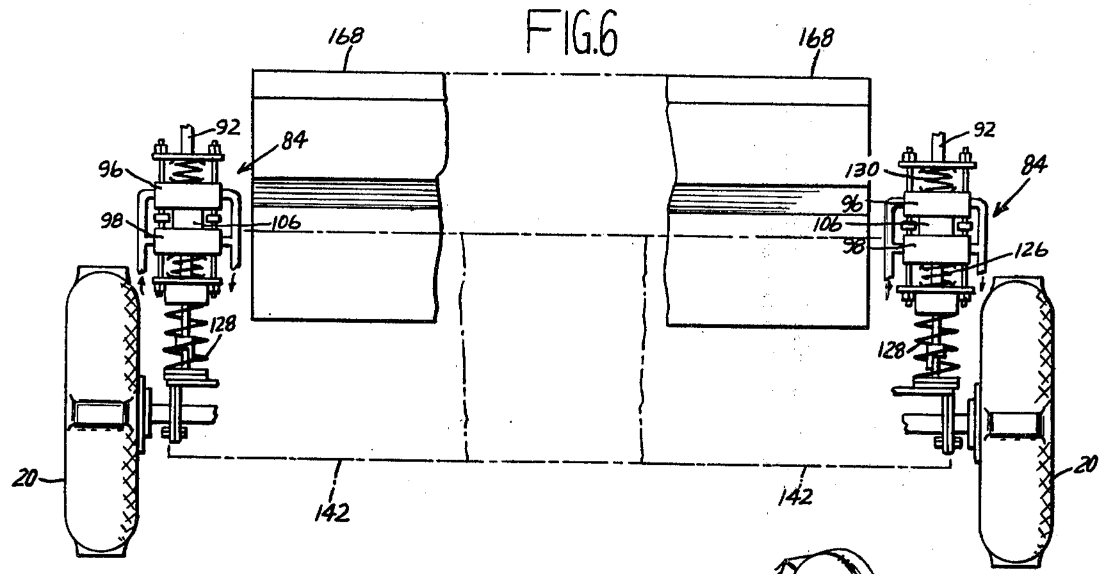
FIG.6
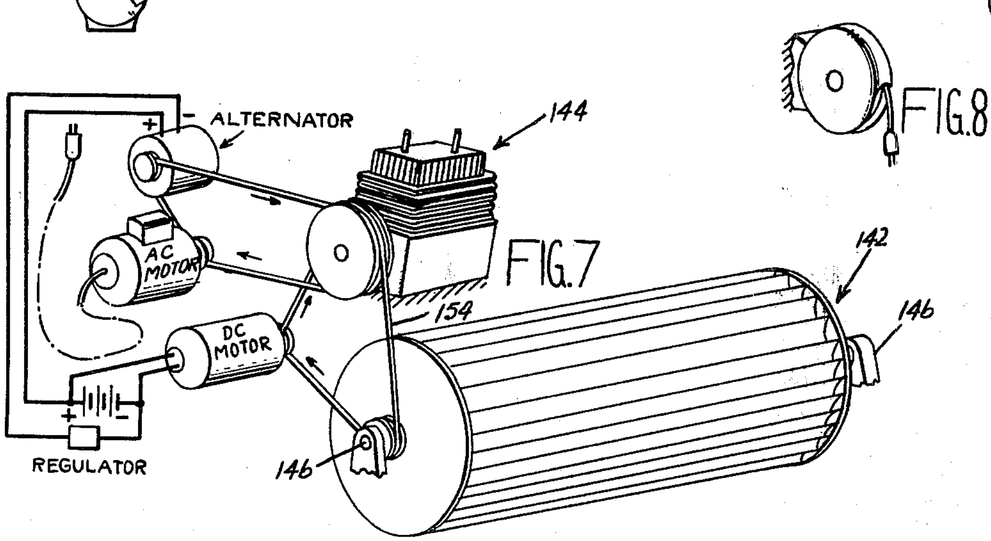
FIG.7
FIG.8

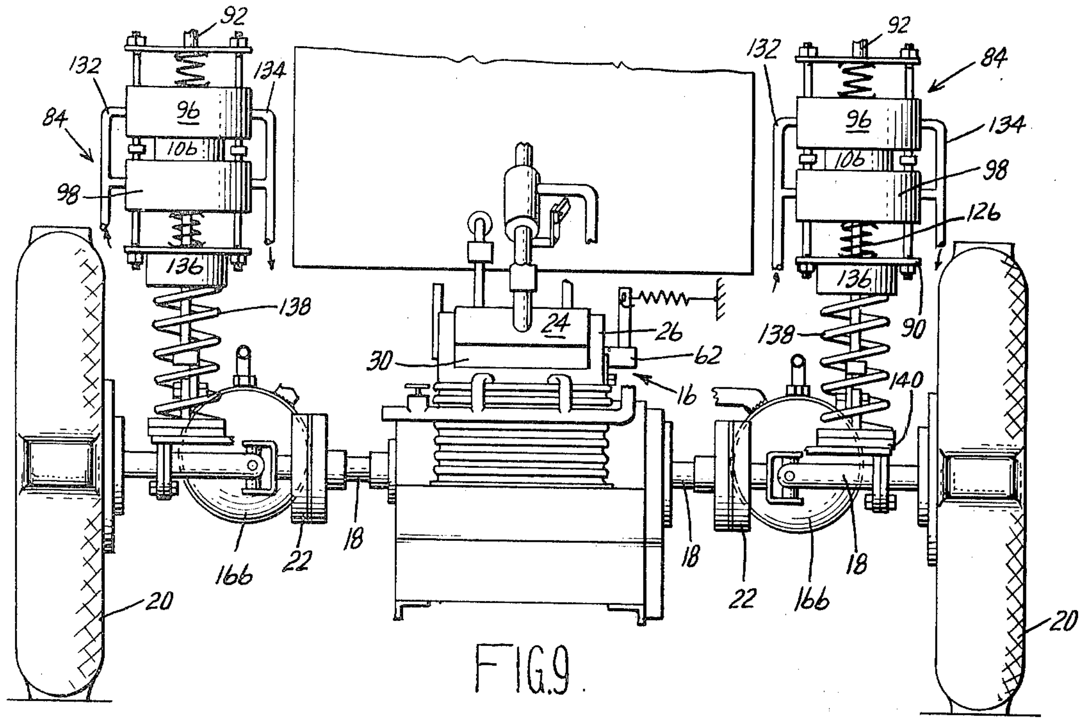
FIG.9
FIG.10
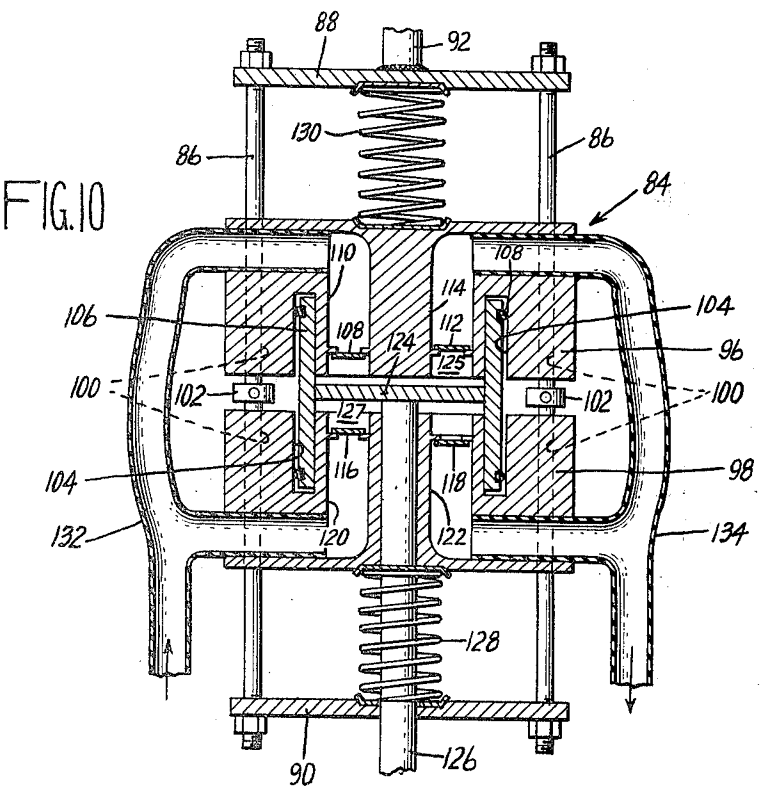

CYL #2
FORWARD
EXHAUST

CYL #1
INTAKE
FORWARD

CYL #2
EXHAUST
REVERSE

CYL #1
INTAKE
REVERSE

AIR POWERED VEHICLE

This is a divisional of application Serial Number 341,318, filed March 14, 1973.

BACKGROUND OF THE INVENTION

FIELD OF THE INVENTION

This invention relates generally to vehicles and more particularly to a vehicle that operates from gaseous fluid such as air under pressure. More specifically, means are provided for generating air pressure from vertical motions of the vehicle.

SUMMARY OF THE INVENTION

In accordance with the broader aspects of this invention there is provided an air powered vehicle having a chassis and wheels. An air powered engine having intake and exhaust systems is mounted on the chassis and has a driving connection with the wheels. A first reservoir of gaseous fluid under pressure is connected to the intake system for operating the engine. Means are provided for regulating the flow of the fluid to the intake system for controlling the operation of the engine.

A second reservoir is connected to the exhaust system for receiving spent air, conduit means being connected between the second reservoir and the intake system. This conduit means is provided with a check valve which limits the flow of air in only the direction from said second reservoir to said intake system.

A suspension-type compressor is operatively connected between a wheel and the chassis, whereby relative vertical motion between the wheel and the chassis will cause operation of the compressor. This compressor is provided with inlet and exhaust ports connected, respectively, to said second and first reservoirs, whereby operation of the compressor pumps air from the second reservoir to the first reservoir.

Means are provided for disconnecting the flow of fluid from the first reservoir to the intake system and connecting the exhaust system to the first reservoir whereby the engine may serve as a compressor for delivering air under pressure to the first reservoir.

It is an object of this invention to provide an air powered vehicle in which pressure air is uniquely generated from the vertical movements of the vehicle.

Still another object of this invention is to provide a suspension type compressor capable of generating air under pressure due to the relative vertical motion of the vehicle suspension system.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 5 is a diagrammatic view taken from the rear of the vehicle of FIG. 1 showing the reciprocating piston engine in perspective and rotated 90° from its normal position;

FIG. 6 is a fragmentary front view of the vehicle of FIG. 1 showing the position of one of the air tanks;

FIG. 7 is a diagrammatic perspective view of the compressor system mounted in the front end of the vehicle;

FIG. 8 is a perspective of the electrical power cord housing and retriever;

FIG. 9 is a fragmentary rear view of the vehicle with the body removed;

FIG. 10 is a longitudinal sectional view of the suspension type compressor;

DESCRIPTION OF THE PREFERRED EMBODIMENT

Figure 1:
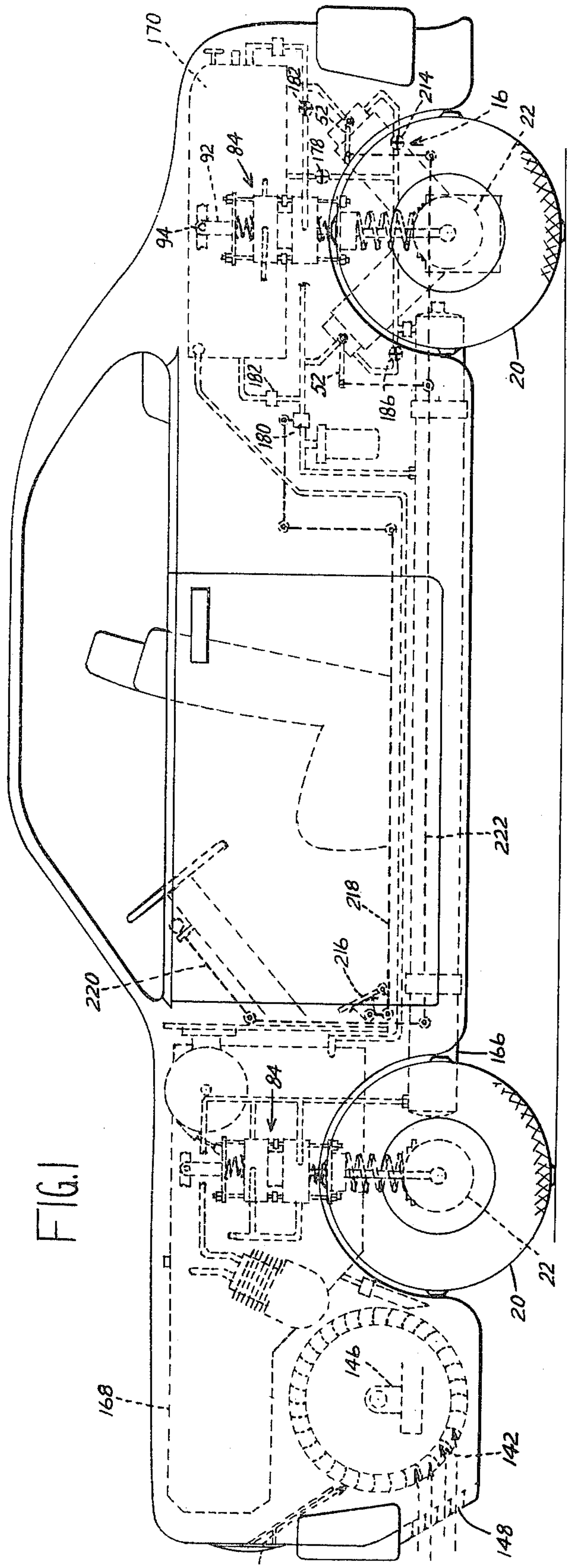
FIG. 1 is a side elevation of a typical vehicle of this invention with certain of the mechanism being shown in phantom.
Figure 3:
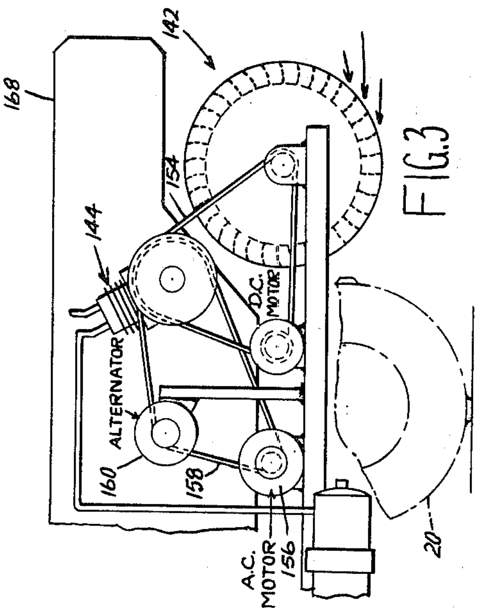
FIG. 3 is a partial side view of the fan compressor mechanism mounted in the front end of the vehicle of FIG. 1.
Figure 2:
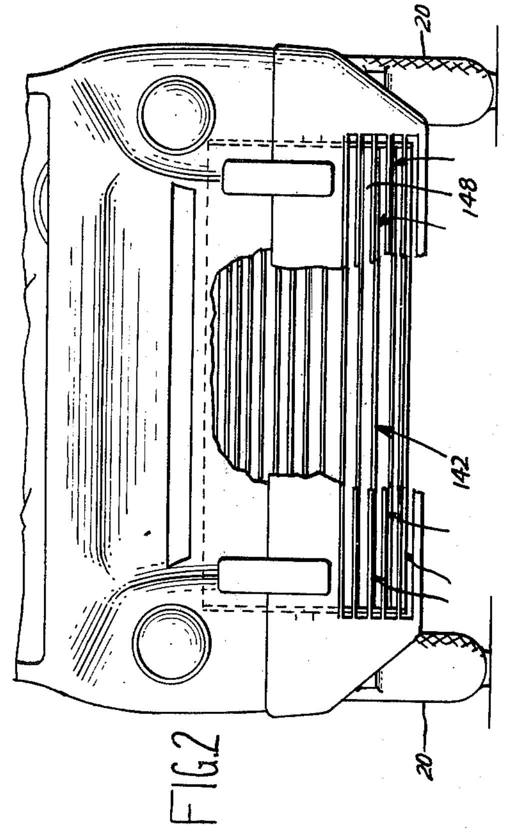
FIG. 2 is a front elevation thereof partially broken away for clarity of illustration.

Referring to the drawings and more particularly to FIG. 1, a vehicle which includes a conventional body, chassis, wheels, suspension system, steering and the like has mounted in the rear end thereof an air powered, reciprocating-piston engine generally indicated by the numeral 16. The engine 16 has its crank shaft (not shown) directly connected to the drive axle 18 (FIG. 9) which in turn is connected to the wheels 20 via two slip clutches 22 which permits one wheel 20 to rotate relative to the other wheel during turning motion of the vehicle.

The engine 16 is conventional in the respect that it corresponds to the usual reciprocating-piston gasoline engine having four cylinders in two banks of two cylinders each in a V configuration as shown more clearly in FIG. 5. Conventional are the piston and cylinder assemblies, the piston rods, the crank shaft, the block and the like. However, the valve mechanism for controlling the intake and exhaust cycles is different as is the cam mechanism for operating the same. Such valve mechanism is shown in more detail in FIGS. 11 through 14.

In general one valve mechanism 24 is provided for each of the two cylinder banks 26 and 28 (FIG. 5). Since both valve mechanisms 24 are constructed the same, a description of one will suffice for both.

Referring to FIGS. 11 through 14, the valve mechanisms 24 each include a body 26 in the form of a rectangular steel block adapted to be securely bolted in fluid-tight relation to the heads 28 of the engine cylinders and have securely bolted thereto also in fluid-tight relation a housing 30 formed of a block of steel having a cavity or plenum 32 therein.

The block 26 for number one cylinder, otherwise indicated by numeral 70, is provided with a cylindrical cavity 34 and communicating intake passages 36, 38, cylinder passages 40, 42 diametrically opposed exhaust passages 44, 46.

That portion of the valve mechanism 24 for number two cylinder 72, is identically arranged with components thereof indicated by the same numerals with the suffix "a" added.

Figure 11B:
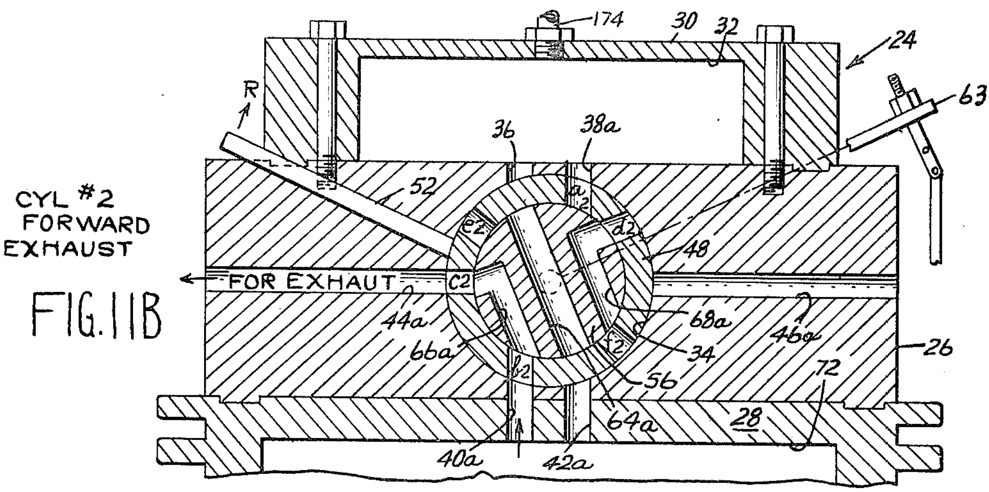
FIGS. 11A and 11B are cross-sections of different parts of the engine valve mechanism in position for forward operation.
Figure 11A:
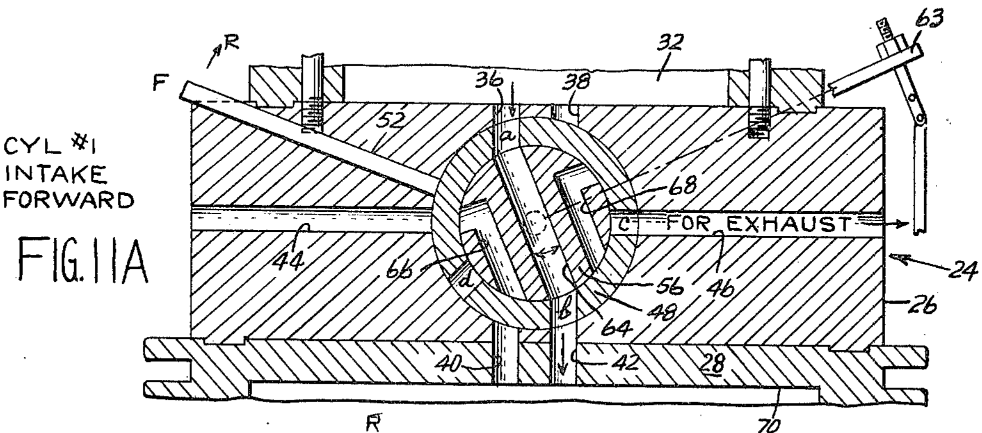

Close fitting in fluid-tight relation in the cylindrical cavity 34 but rotatable therein is a cylindrical sleeve valve or sleeve 48 having a series of rectangular ports indicated by the letters *a, b, c,* and *d* for cylinder 70 as shown in FIG. 11A and *a*2, *b*2, *c*2, *d*2, *e*2 and *f*2 for cylinder 72 as shown in FIG. 11B. The particle angular relationships between these ports are shown in FIGS. 11A and 11B and will be explained further later. These ports are rectangular to coincide in size and shape with the ports 36 through 46. As viewed in FIGS. 13A through 13D and 14, the block 26 has a rectangular notch 50 formed in one end thereof which communicates with the cavity 34, this notch receiving a lever 52 secured to the end of the sleeve valve 48 in notches provided therefor. A suitable plate 54 (FIG. 13B) is bolted to the left-hand end of the block 26 so as to retain the sleeve valve 48 against leftward movement. The right-hand end of the sleeve 48 is flush with the right end of the block 26.

A cylindrical spool valve 56 is rotatably received within the sleeve valve 48 with a close tolerance, fluid-tight fit. As shown more clearly in FIGS. 13A and 13B, a plate 58 is bolted to the right-hand end of the block 26 and is provided with a semi-circular cutout having a semi-circular tongue (not shown) which slidably fits into an annular, coaxial groove 60 in the protruding shaft 62 of the spool valve 56. The plate 58 thereby retains the spool valve 56 against end-wise movement and furthermore retains the sleeve valve 48 from rightward movement.

The spool 56 and the sleeve valves 48 are operated between two different angular or rotated positions, the sleeve 48 (see FIG. 14) being swingable from a first position represented by the dashed-line position of the lever 52 (FIGS. 12A, 12B) to a second position represented by the solid line lever 52*a*. The spool 56 has a first angular position as shown in FIG. 11A and a second angular position as shown in FIG. 12A. For moving the spool valve 56 to these two positions is provided a rocker arm 63 secured to the shaft extension 62 (see FIGS. 13A and 13B).

The spool valve 56 has two sets of transverse passages therein, the sets being axially spaced apart to register with the cylinders 70 and 72 of one of the V-engine banks, such as with ports 36, 38 of one set and 36*a*, 38*a* of the other set. Thus, a description of one set will suffice for both. Referring first to FIG. 11A, the spool valve 56 has a rectangular diametral passage 64 which communicates with the rectangular ports *a* and *b* in the sleeve valve 48 and the passages 36 and 42 in the block 26. Two other passages 66 and 68 on opposite sides of the passages 64 have right angle bends therein as shown and are positioned to communicate with the various ports in the sleeve 48 as shown. In FIG. 11A, neither of the passages 66 and 68 communicate with any sleeve 48 ports. However, in FIG. 11B, passage 66 is shown communicating with the ports *b*2 and *c*2 as well as passages 40*a* and 44*a*, respectively. It may now be stated that FIG. 11A shows the position of the valve mechanism for forward engine operation with cylinder number one (70) on the intake stroke and FIG. 11B with cylinder number two (72) on the exhaust stroke.

Figure 12B:
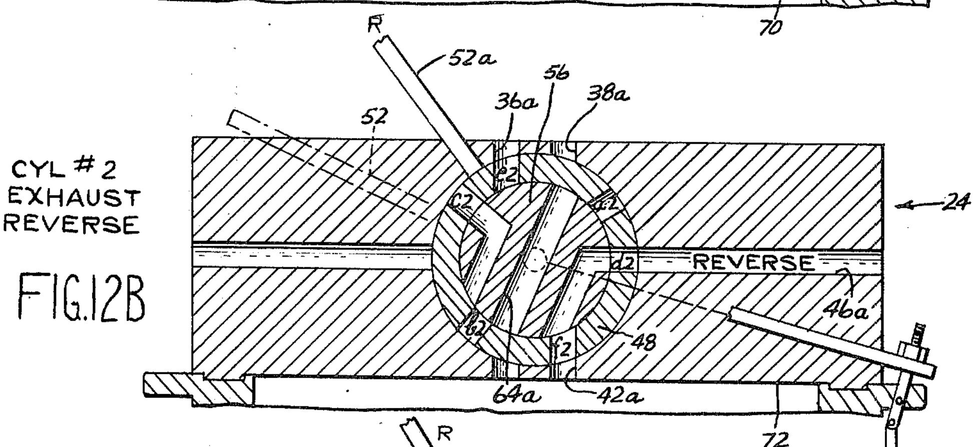
FIGS. 12A and 12B are similar cross-sections but with the parts shown in position for reverse operation of the engine.
Figure 12A:
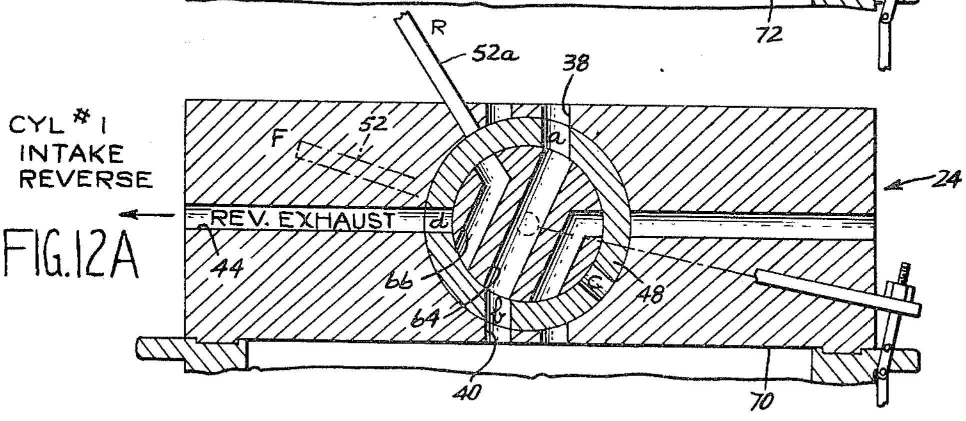
Figure 13A:
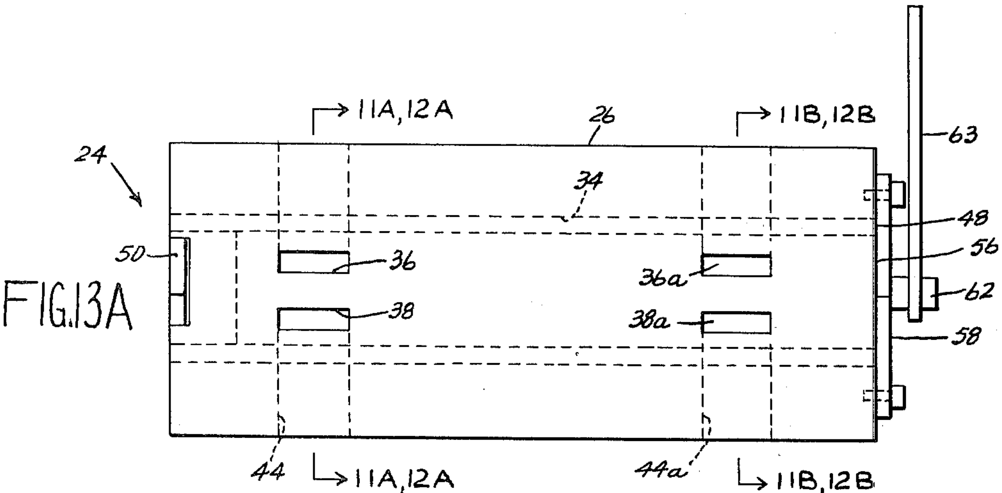
FIGS. 13A and 13B are top and side views, respectively, of the valve mechanism.
Figure 13B:
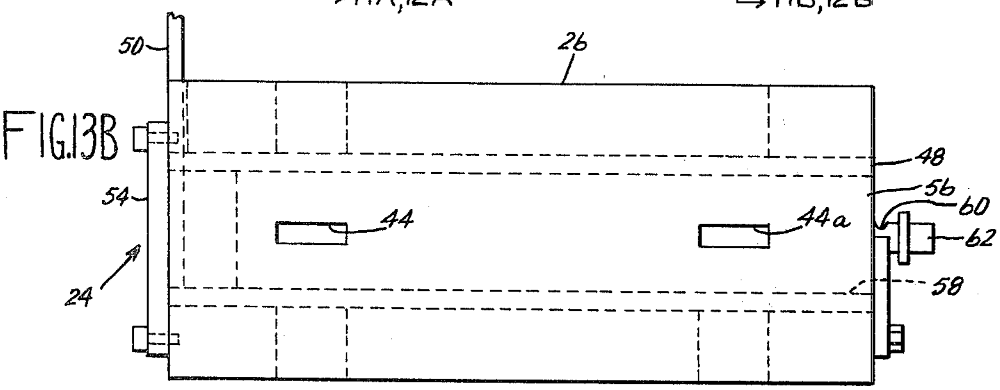
Figure 13C:
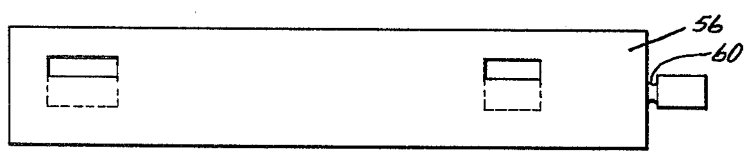
FIG. 13C is a side view of the spool valve used in the mechanism of the preceding figure.
Figure 13D:
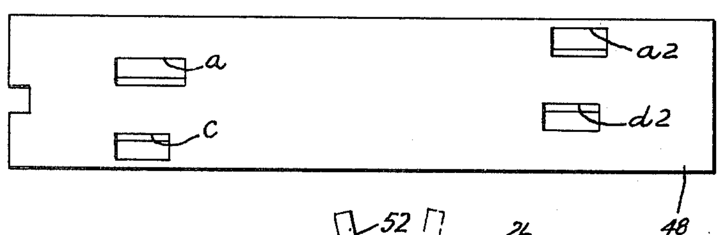
FIG. 13D is a side view of the sleeve valve used in the valve mechanism.
Figure 14:
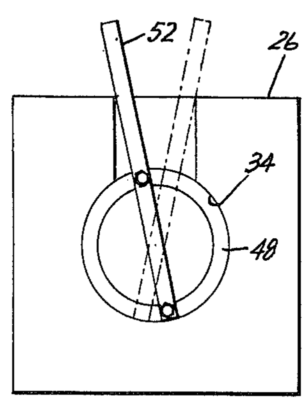
FIG. 14 is an end view of the mechanism of FIGS. 13A and 13B showing the directional control lever.

By moving the spool 56 clockwise to its second position as shown in FIGS. 12A and 12B, with lever 52 remaining in the solidline position of FIGS. 11A, 11B, in FIG. 11A for cylinder number one passage 68 registers with ports *b* and *c* so as to provide an exhaust for cylinder 70, for continuing forward operation of the engine. In FIG. 11B cylinder number two (72) is shown as having ports *a*2 and *b*2 connected by passages 64 with none of the other spool passages connecting with any ports.

It may now be stated that air under pressure is admitted to the plenum 32 from which it may flow through the passages 36, 38, 36*a* and 38*a* through the respective spool 56 passages to the cylinders 70 and 72 as determined by the position of both the sleeve 48 and the spool 56.

Further explanation of operation and port arrangement will now be given for forward operation of the engine as determined by the position of the lever 52 as shown in FIGS. 11, 11B. Referring again to FIGS. 11A and 11B, cylinder 70 of FIG. 11A is on the intake stroke, air pressure from the plenum 32 passing through passage 36, port *a*, passage 64, port *b* and passage 42 into the cylinder 70. Simultaneously therewith, cylinder 72 of FIG. 11B is exhausting with the piston being on the up stroke, exhaust air passing out of the passage 40*a*, port *b*2, passage 66, port *c*2, and exhaust passage 44*a*.

With the spool 56 next swung to its rightward position as shown in FIGS. 12A and 12B, but with the lever 52 in the position of FIGS. 11A, 11B, cylinder 72 (FIG. 11B) intakes through passage 38*a*, port *a*2, passage 64, port *b*2 and passage 40*a* with the piston in cylinder 72 thereby being on its down stroke, while cylinder 70 is exhausting with the piston on the upstroke through passage 42, port *b*, passage 68, port *c* and exhaust passage 46. Thus, by the spool valve 56 oscillating between the two angular positions, cylinders one (70) and two (72) are operated alternately on the intake and exhaust strokes.

For reverse operation of the engine, reference is made to FIGS. 12A and 12B. The lever 52 is moved from the dashed line position to the full line position 52*a* thereby swinging the sleeve valve 48 to the position shown. In this position, the cycle of operation as between cylinders 70 and 72 reverses such that cylinder number one (70) now intakes through passage 38, port *a*, passage 64, port *b*, and passage 40 into cylinder 72. Simultaneously therewith, cylinder number two (72) is exhausting from cylinder 70 through passage 42*a*, port *f*2, passage 68*a*, port *d*2 and out of exhaust port 46*a*. With the spool valve moved to its opposite position as shown in FIGS. 11A and 11B, cylinder 70 (FIG. 12A) will exhaust through passage 40, port *b*, passage 66, and port *d* and out of exhaust passage 44. Simultaneously therewith, cylinder 72, (FIG. 12B) which is also cylinder number two, is intaking through passage 36*a*, port *e*2, passage 64*a*, port *f*2, passage 32*a*, into cylinder 70.

Thus, the position of the sleeve valve 48 as determined by operation of the lever 52 determines whether the engine will operate either forwardly or reversely. The rapid rocking motion of the spool valve 56 between the two illustrated positions determines the intake and exhaust strokes of the cylinders.

Figure 4:
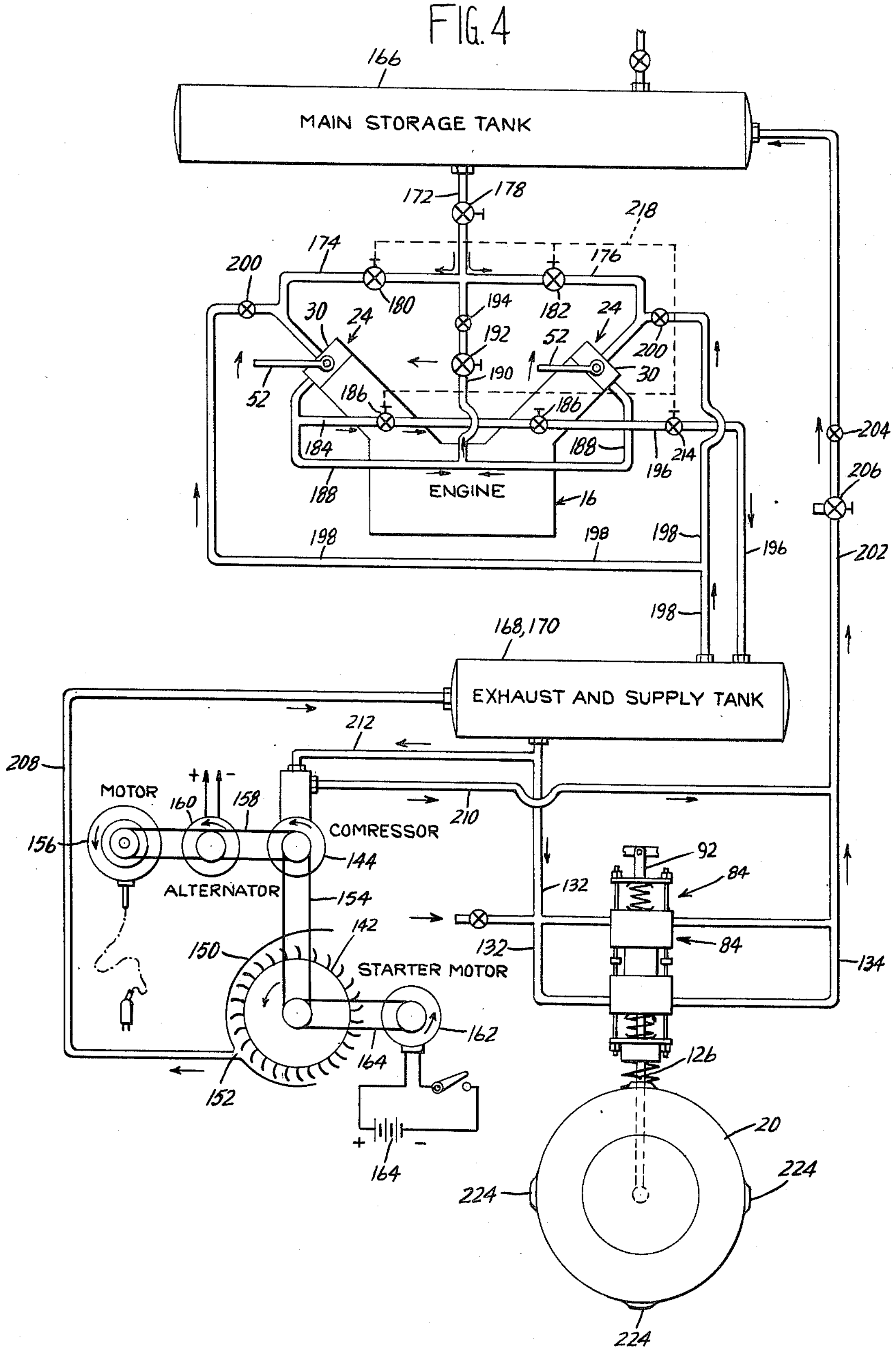
FIG. 4 is a diagrammatic illustration of the fluid pressure system used in the vehicle of FIG. 1.

Referring more particularly to FIGS. 4 and 5, the engine thereshown is of "V-4" configuration having two banks 27 and 29, with two cylinders 70 and 72 being in each bank. Thus, cylinders one (70) and two (72) may be considered to be in the left bank as viewed in FIG. 5 while cylinders three (70) and four (72) will be in the right bank.

The rocker arms 63 on the two valve spools 56 are spring biased by means of suitable tension springs 74 (FIG. 5) such that clockwise force is exerted on the left-hand spool 56 and counterclockwise force on the right-hand spool 56. Operatively connected to each of the rocker arms 63 are two push rods 76 and 78 which ride on a rotatable cam 80 secured to the engine crank shaft 82. As the cam 80 rotates, both of the rocker arms 63 will be swung between two extreme positions as shown in FIGS. 11 and 12, thereby placing the spool valve 56 in position for the intake and exhaust strokes, respectively.

The cam 82 is so shaped and the ports and passages in the valve mechanism 24 so positioned that the piston movement in one bank 27 is 90° out of phase with the piston movement in the other 29. The pistons in one bank 27, 29 are 180° out of phase with each other thereby providing for concurrent exhaust and intake stroking. The cam 80 is so shaped, and the valve mechanisms 24 with the ports and passages therein so positioned that the engine cylinders will "fire" according to a sequence of one, three, two, four. Thus, with piston movement, crank shaft rotation as a result thereof, and cam 80 rotation, the spool valves 56 are oscillated between their intake and exhaust positions for admitting pressure air and providing for exhaust in proper, timed sequence.

Referring now to FIGS. 1, 9 and 10. description of the suspension type compressors 84 will be given. Four such compressors 84 are used, one for each of the four vehicle wheels, such that a description of one compressor 84 will suffice for all. A rectangular, rigid frame includes two upright, horizontally spaced rods 86 having two cross bars 88 and 90 secured to the opposite ends thereof as shown. Secured to the upper cross bar 88 is a tie rod 92 secured rigidly at the end 94 (FIG. 1) to a part of the vehicle frame. Slidably mounted on the rods 86 are two heads 96 and 98 in vertically spaced relation which conform generally to rectangular blocks which are preferably formed of steel. Each of the heads 96 and 98 are provided with bores 100 which closely slidably receive the respective rods 86 whereby the heads 96 and 98 may move vertically on the rods. Spacer blocks 102 on the rods 86 between the heads 96, 98 provide minimum spacing therebetween.

Both heads 96, 98 have formed therein an elongated cylindrical groove 104 adapted slidingly to receive a tubular member 106 having O-ring seals 108 for providing a sliding, sealing engagement with the outer cylindrical walls of the grooves 104. Within each head 96, 98 are provided two valve assemblies, one of these being for intake and the other exhaust. In the head 96 the intake valve is indicated by the numeral 108 in the form of a one-way check valve mounted in a passage 110 in the head. Another valve 112 for exhaust, also being a one-way check valve, is mounted in the passage 114. In the head 98 are two similar valves 116 and 118 in the two passages 120 and 122, respectively.

A piston is reciprocally positioned in the cylinder 106 and has a coaxially extending piston rod 126 secured thereto which is slidably sealingly received by a close fitting coaxial bore in the head 98. The piston rod 126 is adapted to be operatively secured at its distal end (see FIG. 9) to the vehicle axle 16.

A compression spring 128 is interposed between the cross 90 and head 98 as is another compression spring 130 between the cross bar 88 and the head 96. These two springs 128, 130 yieldably urge the heads 96, 98 toward each other into abutting engagement with the respective ends of the tubular cylinder 106. Movement of the heads 96, 98 on the rods 86 is, as explained previously, limited by the stops 102.

Connected to the passages 110, 120 is a flexible conduit 132, another flexible conduit 134 being connected to the other two passages 114 and 122.

For the suspension compressor 84, the conduit 132 constitutes the air intake and the conduit 134 the exhaust. Since the rod 92 is secured to the vehicle chassis, for purposes of explaining the operation of the compressor, the rod 92 may be regarded as stationary with respect to the movable piston rod 126 which is secured to the vehicle axle which obviously moves vertically as the wheels 20 move over uneven terrain.

Thus, as the piston rod 126 moves vertically from its illustrated position (FIG. 10), any air trapped in chamber 125 will be exhausted past check valve 112 out of conduit 134, the check valve 108 remaining closed since it will open only for air flow in the opposite direction. Simultaneously therewith, check valve 116 will be unseated thereby to admit air through conduit 132 into the chamber 127. On the down stroke of piston 124, air trapped in chamber 127 is forced through check valve 118, valve 116 remaining closed, and out of the exhaust conduit 134. Simultaneously, air is drawn through valve 108 into chamber 125, check valve 112 remaining closed. Thus, as the piston rod 126 reciprocates, air will be pumped from the intake conduit 132 outwardly through the exhaust conduit 134.

If the vehicle wheel 20 should encounter a sizable bump which causes corresponding upward movement of the piston rod 126, the piston 124 will engage the underside of the head 96 causing it to move upwardly slightly against the force of spring 130. Conversely, should the piston 124 move downwardly sufficiently to engage the head 98, the latter will move downwardly against the force of its spring 128. Any such movement of the heads 96 and 98 will correspondingly provide an increase in the size of the respective chamber 125, 127 whereby on that stroke a larger volume of air will be taken in and exhausted via the conduits 132, 134, respectively.

As seen in FIG. 9, the cross bar 90 is secured to a suitably, rigid pad 136 through which the piston rod 126 projects, a helical compression spring, which serves as the spring suspension for the vehicle, bearing thereagainst and against another pad 140 which is secured to the axle 18 as shown. Thus, the load of the vehicle rests primarily on the springs 138 which permit relative movement between the axle 18 and the vehicle chassis such that the piston 124 in the compressor 84 may reciprocate vertically.

Now referring to FIGS. 1 through 3, 7 and 8, compressor system mounted in the front end of the vehicle will be described. This system includes a compressor type fan, generally indicated by the numeral 142, the fan in this instance being of the squirrel cage type, and a conventional reciprocating piston compressor indicated by the numeral 144. The fan 142 is generally cylindrical, having the usual circumferentially arranged blades, and is journalled in bearings 146 to rotate about its axis arranged parallel to the axles of the vehicle. As shown in FIG. 1, the fan 142 is exposed forwardly to air flow through the front of the vehicle via an open grill 148 such that during forward motion, air flow causes rotation of the fan 142. As shown diagrammatically in FIG. 4, the fan 142 is provided with the usual hood 150 having an outlet 152 through which air pumped by the fan 142 may escape from the chamber between the hood 150 and fan 142.

The compressor 144 is fixedly mounted on a stationary part of the vehicle, and is driven by a belt 154 connected to the fan 142. Thus, as the fan 142 rotates, the compressor 144 will be operated to produce compressed air. Also mounted on the vehicle chassis is an alternating current motor 156 drivingly connected to the compressor 144 by means of a belt 158. A conventional alternator 160 mounted on the chassis is also drivingly connected to both the motor 156 and compressor 144 by means of the belt 158.

A starter motor 162 mounted on the vehicle chassis and operative from a conventional vehicle storage battery is drivingly connected to the fan 142 and compressor 144 by means of a belt 164. Thus, the compressor 144 may be driven by any one or more of three different power sources, the fan 142 and the two motors 156 and 162. For operating the motor 162, the conventional electrical circuit to a storage battery 164 is utilized.

Referring now more particularly to FIGS. 1, 3, 5 and 6, additional components used in the fluid power operating system will be described. Mounted rigidly to the underneath side of the vehicle chassis are two main reservoirs or storage tanks (FIG. 9) connected in parallel by suitable piping. In the front end of the vehicle is mounted a storage tank 168 and in the rear another storage tank 170. All of the storage tanks, of course, are fixedly secured in place in the vehicle.

The various parts and mechanisms thus far described are connected together in a fluid system shown diagrammatically in FIG. 4. The reservoir or main storage tank 166 is of such strength as to contain air at relatively high pressure, such as 100 to 150 pounds per square inch. Outlet piping connected to this tank includes a section 172, and two branches 174 and 176, these latter branches being connected to the plenum housing 30 of the two valve mechanisms 24 (FIGS. 11 and 12). A main control valve 178 in the section 172 may close or open in degrees the latter as may be desired. Two other control valves 180 and 182 connected in series with the two branches 174 and 176, respectively, are manually controllable to determine the flow of pressure fluid through the branches. Thus, with valves 178, 180 and 182 fully opened, air at the pressure in the tank 166 is communicated to the plenums 32 for the engine cylinders.

The exhaust passages of the valve mechanisms 24 as shown in FIGS. 11 and 12 are connected together by a pipe 184 having a manually controlled regulating valve 186 in a series therewith. Another section of pipe 188 connects between the exhaust passages of the valve mechanisms 24 and also back to the pipe section 172 via a branch 190. In this branch 190 is a shut-off valve 192 and a one-way check valve 194 which permits flow only in the direction upward, or in other words, toward the tank 166. The valve 192 is vented to atmosphere such that air in the system may be vented.

Another pipe 196 is connected to the exhaust system of the two valve mechanisms 24 and to the storage tanks 168, 170 as shown. Another pipe 198 is connected to tanks 168, 170 back to the intake side of the two valve mechanisms in parallel with the branches 174, 176. One-way check valve 200 are provided in the lines 198 as shown to permit flow in only the direction from the tanks 168, 170 to the plenums 32 of the valve mechanisms.

Also connected to the supply tanks 168, 170 is the conduit 132 which leads to the suspension compressor 84. Suffice it to say at this point all four of the suspension compressors 84 are connected in parallel such that there would be four lines 132 connected to the supply tanks 168, 170. The exhaust conduit 134 of the compressor 84 is connected by means of a line 202 back to the main storage tank 166, a one-way check valve 204 therein permitting flow only in this direction, and a manually controlled shut-off valve 206 being operable to close off the line 206 and furthermore vent the pressure in the system to atmosphere if desired.

The outlet 152 from the fan compressor 142 is connected by means of a pipe 208 to the supply tanks 168, 170 while the exhaust side of the compressor 144 is connected by means of the line 210 to line 202, with the input thereto being connected by a line 212 to the tanks 168, 170.

A manually controlled valve 214 is connected in the line 196 leading from the exhaust side of the engine 16, and this valve is connected by suitable mechanical linkages to the other valves 180, 182 and 186 for operating the engine 16. Such engine control is shown in one form in FIG. 1 as including an accelerator pedal 216 connected by means of a control line, such as a Bowden cable, to the valves 174, 176, 186 and 214 such that all these valves may be operated in the same manner simultaneously. A Bowden cable is well known, consisting of a stiff wire reciprocably contained in a tubular supporting sheath, such cable being conventional in operating carburetor chokes and the like of internal combustion engines. To start the engine 16, the valve 178 is first opened following which the pedal 216 (FIG. 1) is operated to open the valves 180, 182, 186 and 214. Air under pressure is admitted to the plenums 32 in the valve mechanisms 24, to cause operation of the engine as already explained. Spent exhaust fluid passes to the tanks 168, 170 via the line 196 where it is stored until it is pumped therefrom back to the main storage tank.

For braking the vehicle, assuming that the vehicle is in forward motion, the pedal 216 is operated reversely to close the valves 180, 182, 186 and 214 in which event the engine 16 becomes a compressor, withdrawing air from the supply tanks 168, 170 via the lines 198 and pumping it back to the storage tank 166 via the line 188, branch 190, and through the check valve 194. Thus, during coasting or down-hill movement of the vehicle, the engine 16 may be used as a compressor for producing compressed air which is returned to the storage tank 166.

For reversing the movement of the vehicle, a control 220 in the cab is operated, this control being connected by means of a Bowden line 222 to the levers 52 (FIGS. 1, 11 and 12), moving these levers 52 to their reverse positions. As explained previously in connection with the valve mechanisms of FIGS. 11 and 12, pressure air in the plenums 32 will cause reverse operation of the engine 16.

During motion of the vehicle over uneven terrain, the wheels 20 will move vertically in the usual manner causing corresponding movement of the pistons 124 (FIG. 10) in the suspension compressors 84. This results in withdrawing air from supply tanks 168, 170, compressing and exhausting it through conduit 134 and line 202 back to the main storage tank 166. For facilitating this pumping action, circumferentially spaced bumps 224 are applied to the peripheries of the wheels 20 whereby reciprocatory movement of the pistons 124 is assured.

The compressors 142 and 144 are operated primarily from the air flow induced by forward motion of the vehicle. This motion rotates the fan 142 which in turn operates the compressor 144. The fan 142 with its shroud or hood 150 produces some air flow back to the tanks 168, 170 via the line 207. The compressor 144 operates to provide compressed air to the line 202 and back to the storage tank 166.

When the compressed air in the system becomes depleted, operation of the motor 156 drives the compressor 144 for refilling the storage tank 166. If alternating current power is not available, the D.C. motor 162 which operates from the vehicle battery 164 is energized for driving the compressor 144. Simultaneously therewith, the fan 142 is operated, this assisting to a small extent the supplying of air to the system while the vehicle is stationary.

During operation of the vehicle, the alternator 160 is driven, and this is operatively connected to the storage battery 164 for maintaining the charge thereon.

When not in operation, for example at night in the garage, the motor 156 may be connected to an electrical outlet for the purpose of recharging the storage tank 166. Necessary conventional automatic devices may be employed for cutting off the electrical motor 156 when the tank 166 has become suitably filled.

The vehicle is operated solely, in the preferred embodiment, by the use of compressed air initially stored in the tank 166. The vehicle may be operated to move forwardly, rearwardly, and furthermore the engine may be used as a compressor during coasting, braking or down hill motion of the vehicle, thereby restoring spent pressure to the storage tank 166. Vertical motion of the wheels is utilized for the purpose of operating the suspension pumps 84, further replenishing the used energy taken from the storage tank 166. Also during vehicle movement in coasting, braking or down hill, the fan 142 is operated when a sufficient velocity has been reached, for pumping air back into the system.

Inasmuch as the vehicle operates on compressed air, it is obvious that in contrast with the internal combustion engine, there will be less pollution of the atmosphere, it will not be necessary to use inflammable liquid, and the air which is used as fuel is ever present in the atmosphere. The engine itself uses a minimum of moving parts, is simpler in construction than its internal combustion counterpart and is more economical to produce and operate. Also, the engine will operate with less noise than is true of the gasoline engine.

While there have been described above the principles of this invention in connection with specific apparatus, it is to be clearly understood that this description is made only by way of example and not as a limitation to the scope of the invention.

What is claimed is:

1. For use on a vehicle, a suspension type compressor comprising a cylinder device having a reciprocable piston which defines two pressure chambers therewith, a piston rod secured to said piston and extending axially therefrom, means for securing said cylinder device and piston between the frame and axle of a wheeled vehicle; said cylinder device including two separate heads arranged one above the other, means mounting said heads for limited relative movement, means yieldably urging said heads toward each other, and intake and exhaust valve means in each head responsive to reciprocation of said piston in said cylinder device for drawing gaseous fluid into and forcing such fluid out of said chambers.

2. The compressor of claim 1 in which said cylinder device includes a tubular element slidably sealingly fitted into companion grooves in the facing portions of said heads, each said head having two check valves therein communicating with respective ones of said chambers, one of each of said two valves being an intake valve and the other an exhaust valve, and intake and exhaust conduits connected, respectively, to said intake and exhaust valves.

3. The compressor of claim 2 in which said head-mounting means includes a rigid frame having two laterally spaced upright rods received by companion guide bores in opposite lateral portions of said heads, said frame having two cross bars secured to opposite ends of said rods, said yieldable means including two helical compression springs, respectively, interposed between said cross bars and the adjacent heads, said piston rod slidably passing through one head, a respective spring and one cross bar, said heads having facing surfaces which define opposite ends of said chambers, respectively, said piston being disposed between said facing surfaces thereby to move the heads against the respective spring, and stops on said rods, respectively, between said heads and engageable therewith upon predetermined relative movement of said rods and heads.

4. The compressor of claim 3 in which said heads are spaced apart and said stops being disposed in the space therebetween.

5. The compressor of claim 4 including two flexible conduits, each conduit having two branches, the two branches of one conduit communicating, respectively, with the intake valves in said heads and the two branches of the other conduit communicating, respectively, with the exhaust valves in said heads.

6. The compressor of claim 5 in which said intake and exhaust valve means in each head includes two passages communicating at common ends thereof with said chambers, respectively, the opposite common ends of said passages communicating with said branches, respectively, and check valves in said passages, respectively.

7. The compressor of claim 6 in which said passages in each head are spaced apart and elongated in parallelism with said tubular element, said conduits being flexible to accommodate relative motion of said heads.

8. The compressor of claim 7 including an axle connected to one of said piston and frame, a wheel on said axle, and said wheel having one or more raised portions on the periphery thereof whereby said piston is reciprocated relative to said tubular element as said wheel rolls over a level surface.

* * * * *